(No Model.)

M. W. FORD, Jr.
WHEEL HUB.

No. 449,264. Patented Mar. 31, 1891.

Witnesses.
Fred S. Greenleaf.
Frederick L. Emery.

Inventor.
Martin W. Ford Jr.
by Crosby & Gregory
attys.

UNITED STATES PATENT OFFICE.

MARTIN W. FORD, JR., OF MANCHESTER, NEW HAMPSHIRE, ASSIGNOR OF ONE-HALF TO FRED. S. BEAN, OF SAME PLACE.

WHEEL-HUB.

SPECIFICATION forming part of Letters Patent No. 449,264, dated March 31, 1891.

Application filed January 13, 1891. Serial No. 377,627. (No model.)

*To all whom it may concern:*

Be it known that I, MARTIN W. FORD, Jr., of Manchester, county of Hillsborough, State of New Hampshire, have invented an Improvement in Wheels, of which the following description, in connection with the accompanying drawings, is a specification, like letters on the drawings representing like parts.

It is now common when getting into and out of carriages hastily to use the hub of the wheel as a step, and in such haste it is not unfrequent that the foot slips off the hub, owing to its circular form, and a severe injury to the knee results. In carriages where the wheels are arranged close to the body, also in fire-engines, hose-carriages, and the like, the hub of the wheel is used as a step quite generally, and many accidents have arisen.

This invention has for its object to provide the hub of the wheel which is liable to be used as a step with a friction band or ring—such, for instance, as a rubber band or ring—it being placed or sprung onto the hub in any usual way and secured thereto, if deemed desirable. This rubber band or ring always presents a yielding frictional surface, and a person stepping onto such band or ring will not easily slip.

Figure 1:
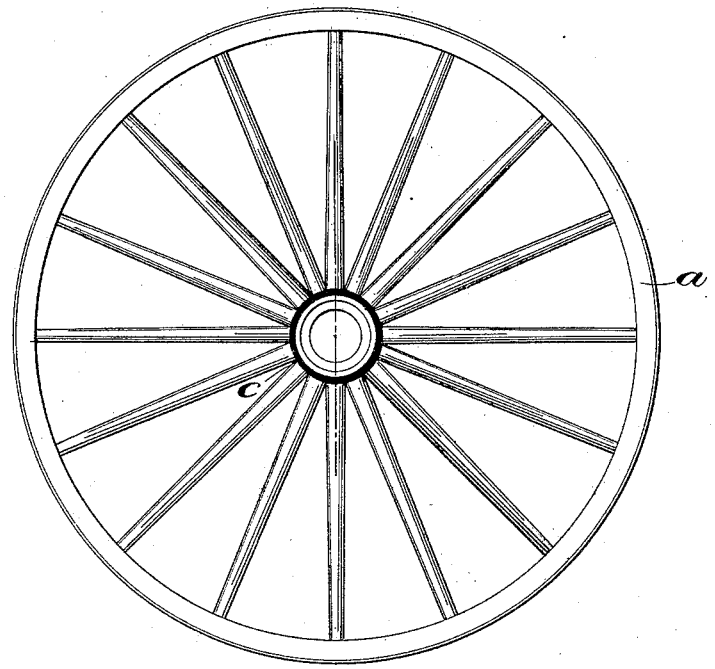
Figure 2:
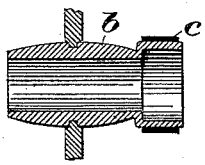

Figure 1 shows, in side view, a wheel upon the hub of which a rubber band or ring is placed, and Fig. 2 a sectional detail of the hub with the rubber band on it.

The wheel $a$ and hub $b$ may be of any well-known or suitable construction. A rubber band or ring $c$ is placed on the hub $b$, such band or ring being of a suitable thickness to present a yielding frictional surface, which may be utilized as a tread surface or step.

A person who is hastily entering a carriage or attempting to reach the driver's seat of a fire-engine or hose-carriage will step on the rubber band or ring on the hub, and, owing to its yielding and frictional surface, his foot will not slip, and hence by its use many accidents will be avoided.

I claim—

The wheel $a$ and hub $b$, combined with the yielding rubber band or ring $c$ on the outer end of and completely encircling said hub $b$, substantially as and for the purposes set forth.

In testimony whereof I have signed my name to this specification in the presence of two subscribing witnesses.

MARTIN W. FORD, JR.

Witnesses:
FRANK M. GERRISH,
ISAAC L. HEATH.